United States Patent
Fujii et al.

(10) Patent No.: US 12,027,930 B2
(45) Date of Patent: Jul. 2, 2024

(54) DC MOTOR

(71) Applicant: DENSO CORPORATION, Kariya (JP)

(72) Inventors: Shota Fujii, Kariya (JP); Tomoki Yamashita, Kariya (JP); Naoki Matsumoto, Kariya (JP); Ryosuke Oguri, Kariya (JP)

(73) Assignee: DENSO CORPORATION, Kariya (JP)

( * ) Notice: Subject to any disclaimer, the term of this patent is extended or adjusted under 35 U.S.C. 154(b) by 113 days.

(21) Appl. No.: 17/299,161

(22) PCT Filed: Dec. 17, 2019

(86) PCT No.: PCT/JP2019/049259
§ 371 (c)(1),
(2) Date: Jun. 2, 2021

(87) PCT Pub. No.: WO2020/129922
PCT Pub. Date: Jun. 25, 2020

(65) Prior Publication Data
US 2022/0037974 A1     Feb. 3, 2022

(30) Foreign Application Priority Data

Dec. 17, 2018 (JP) ................... 2018-235280
Dec. 17, 2018 (JP) ................... 2018-235281
Dec. 17, 2018 (JP) ................... 2018-235282

(51) Int. Cl.
*H02K 23/66* (2006.01)
*H02K 1/10* (2006.01)
(Continued)

(52) U.S. Cl.
CPC ............ *H02K 23/66* (2013.01); *H02K 1/10* (2013.01); *H02K 1/2791* (2022.01); *H02K 13/10* (2013.01);
(Continued)

(58) Field of Classification Search
CPC .......... H02K 1/10; H02K 13/10; H02K 23/66; H02P 7/00; H02P 7/0094; H02P 7/06
See application file for complete search history.

(56) References Cited

U.S. PATENT DOCUMENTS 6,346,756 B1    2/2002  Ishikawa et al.
7,668,690 B2 *  2/2010  Schneider ............ H02P 7/2805
                                                        318/470
(Continued)

FOREIGN PATENT DOCUMENTS

EP    2096414 A1 *  9/2009  ............ G01D 3/021
JP    2007-116813 A    5/2007
(Continued)

OTHER PUBLICATIONS

Feb. 18, 2020 International Search Report issued in International Patent Application No. PCT/JP2019/049259.

*Primary Examiner* — Tulsidas C Patel
*Assistant Examiner* — Joshua Kiel M Rodriguez
(74) *Attorney, Agent, or Firm* — Oliff PLC

(57) ABSTRACT

A DC motor is configured so that, while either one of a pair of power feeding brushes makes contact with two commutator segments, the other makes contact with only one of two commutator segments. The DC motor is further provided with: a plurality of coils; a filter unit; and a calculation unit. The number of turns of a predetermined coil among the plurality of coils is different from the numbers of turns of the other coils. The filter unit allows the passing of the waveform of current generated on the basis of the fact that the numbers of turns are different from each other, and interrupts the waveform of current generated at the switching of the states of the contacts of the power feeding brushes to the commutator segments. The calculation unit calculates a rotational speed from the waveform passed through the filter unit.

7 Claims, 9 Drawing Sheets

(51) Int. Cl.
*H02K 1/2791* (2022.01)
*H02K 13/10* (2006.01)
*H02P 7/00* (2016.01)
*H02P 7/06* (2006.01)

(52) U.S. Cl.
CPC .............. *H02P 7/0094* (2013.01); *H02P 7/06* (2013.01); *H02K 2213/03* (2013.01)

(56) References Cited

U.S. PATENT DOCUMENTS

| | | | |
|---|---|---|---|
| 9,270,216 B2 * | 2/2016 | Knezevic | ............... G01D 3/032 |
| 2007/0013331 A1 * | 1/2007 | Kalb | .................... H02K 11/225 |
| | | | 318/400.23 |
| 2010/0187937 A1 | 7/2010 | Faber et al. | |

FOREIGN PATENT DOCUMENTS

| | | | |
|---|---|---|---|
| JP | 2010-183793 A | | 8/2010 |
| JP | 2010183793 A | * | 8/2010 |
| JP | 2011-109880 A | | 6/2011 |
| JP | 2013-212028 A | | 10/2013 |
| JP | 2014-064424 A | | 4/2014 |
| JP | 2014064424 A | * | 4/2014 |

* cited by examiner

DC MOTOR

CROSS-REFERENCE TO RELATED APPLICATION

This application is based on Japanese Patent Application No. 2018-235280 filed on Dec. 17, 2018, Japanese Patent Application No. 2018-235281 filed on Dec. 17, 2018, and Japanese Patent Application No. 2018-235282 filed on Dec. 17, 2018, the entire contents of which are incorporated herein by reference.

TECHNICAL FIELD

The present disclosure relates to a direct current motor.

BACKGROUND ART

A conventional direct current (DC) motor may be a motor including 2P poles (where P is integer greater than or equal to two) and slots and commutator segments, the number of which cannot be divided evenly by 2P, such as a 4-pole 10-slot motor. In this DC motor, one of two power feeding brushes may contact two commutator segments while the other one of the two power feeding brushes contacts only one commutator segment (for example, refer to Patent Document 1). In such a DC motor, the waveform of the current generated by the switching of the contact state of the power feeding brushes with the commutator segments has a smaller amplitude than a DC motor in which two power feeding brushes are in contact with two commutator segments, respectively at the same moment. Accordingly, vibration and noise are reduced.

Further, in a conventional DC motor, the waveform cycle of current that is presently measured and the waveform cycle of current that was measured in the past are used to calculate the average waveform cycle of current and the DC motor may be controlled based on the average waveform cycle (for example, refer to Patent Document 2). Such a DC motor reduces erroneous cycle detections that would be caused when a peak of the current waveform is missing or split.

PRIOR ART LITERATURE

Patent Documents

Patent Document 1: Japanese Laid-Open Patent Publication No. 2007-116813
Patent Document 2: Japanese Laid-Open Patent Publication No. 2011-109880

SUMMARY OF THE INVENTION

A DC motor may detect the rotation speed from the current waveform. This eliminates the need for a Hall element or the like used for rotation speed detection and reduces costs. However, in such a DC motor, the current waveform has a small amplitude. Thus, vibration or the like of the power feeding brushes may cause waveform disturbance. Thus, when detecting the rotation speed from the current waveform, the determination may be erroneous. Specifically, in a DC motor such as that described above, vibration or the like of the power feeding brushes may split a peak that is normally produced in the current waveform into two small peaks. This would result in the peak, which would be counted as one peak under a normal situation, being counted as two or counted as null.

Further, the DC motor described in Patent Document 2 functions normally when peaks in the current waveform are intermittently missing or split. However, if the peaks in the current waveform are successively missing or split, the DC motor may be controlled based on erroneous determinations.

A first objective of the present disclosure is to provide a DC motor that enables highly accurate detection of the rotation speed.

A second objective of the present disclosure is to provide a DC motor that enables highly accurate detection of a waveform anomaly in the current.

To accomplish the first objective, a DC motor in accordance with a first mode of the present disclosure includes two power feeding brushes and two commutator segments. The DC motor is configured so that when one of the two power feeding brushes is in contact with the two commutator segments, the other one of the two power feeding brushes is in contact with only one of the two commutator segments. The DC motor further includes an armature core, windings, a filter, and a calculator. The armature core includes teeth. The windings are respectively wound around the teeth. The windings are set so that among the windings, a number of turns of a predetermined winding differs from a number of turns of the windings other than the predetermined winding. The filter is configured to pass a current waveform generated by the difference in the number of turns and block a current waveform generated by switching of a contact state of the power feeding brushes with the commutator segments. The calculator is configured to calculate a rotation speed from the current waveform passed through the filter.

To accomplish the second objective, a DC motor in accordance with a second mode of the present disclosure includes an armature core, windings, a first filter, two power feeding brushes, two commutator segments, a second filter, and a detector. The armature core includes teeth. The windings are respectively wound around the teeth. The windings are set so that among the windings, a number of turns of a predetermined winding differs from a number of turns of the windings other than the predetermined winding. The first filter is configured to pass a current waveform generated by the difference in the number of turns. The second filter is configured to pass a current waveform generated by switching of a contact state of the two power feeding brushes with the commutator segments. The detector is configured to detect a waveform anomaly in current using the current waveform that passed the first filter and the current waveform that passed the second filter.

To accomplish the first objective, a DC motor in accordance with a third mode of the present disclosure includes two power feeding brushes and two commutator segments. The DC motor is configured so that when one of the two power feeding brushes is in contact with the two commutator segments, the other one of the two power feeding brushes is in contact with only one of the two commutator segments. The DC motor further includes an armature core, windings, and a detector. The armature core includes teeth. The windings are respectively wound around the teeth. The windings are set so that among the windings, a number of turns of a predetermined winding differs from a number of turns of the windings other than the predetermined winding. The detector detects a rotation speed from a current waveform generated by the difference in the number of turns.

BRIEF DESCRIPTION OF THE DRAWINGS

The invention, together with objects and advantages thereof, may best be understood by reference to the following description of the presently preferred embodiment together with the accompanying drawings.

MODES FOR CARRYING OUT THE INVENTION

A first embodiment of a direct current (DC) motor will now be described with reference to FIGS. 1 to 6.

Figure 1:
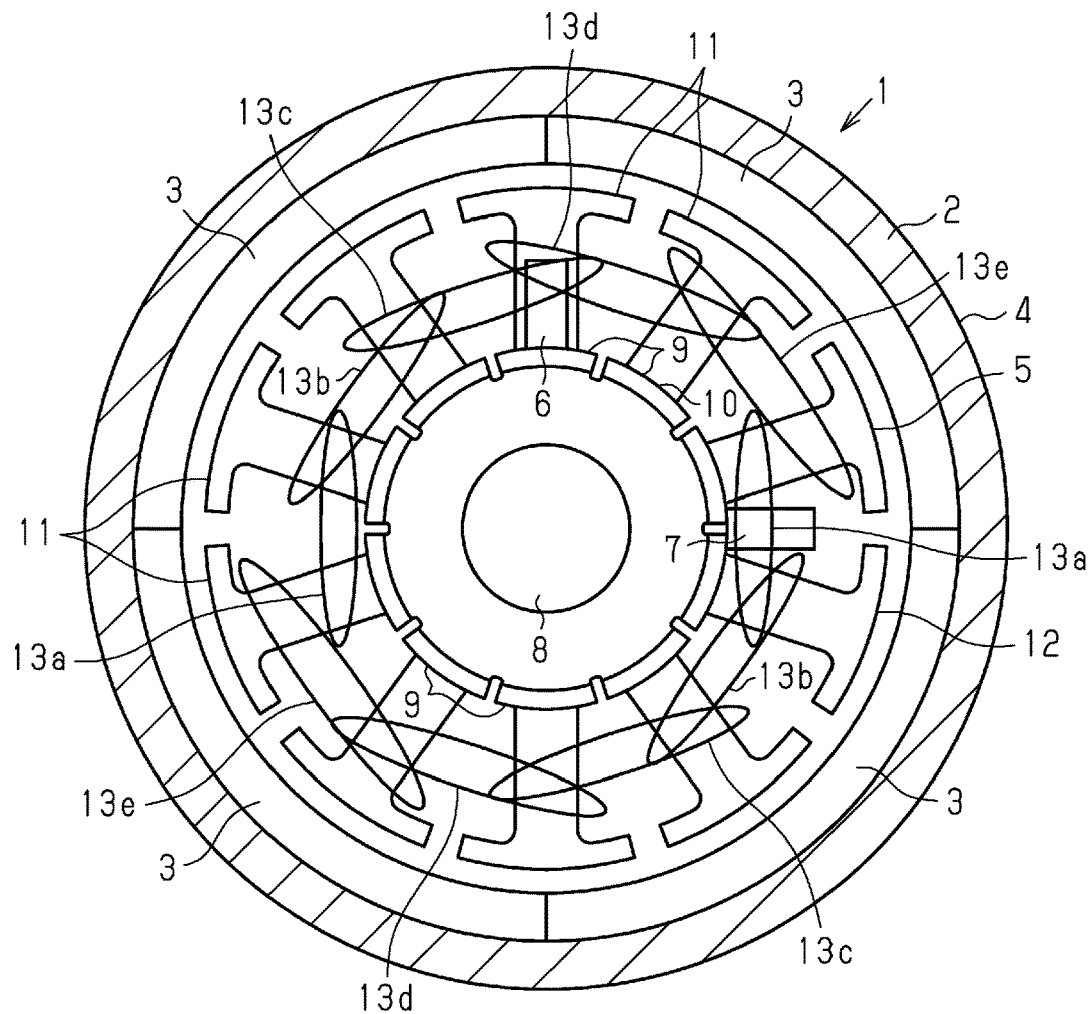
FIG. 1 is a partial cross-sectional view showing a motor body of a DC motor in accordance with first to third embodiments.

As shown in FIG. 1, the DC motor includes a motor body 1. The motor body 1 includes a stator 4, a rotor 5, and two power feeding brushes 6 and 7. The stator 4 includes a substantially cylindrical yoke 2 and four permanent magnets 3 fixed to an inner circumferential surface of the yoke 2. The rotor 5 is supported at an inner side of the stator 4 and rotatable relative to the stator 4. The two power feeding brushes 6 and 7 are supported by the stator 4.

The rotor 5 includes a rotation shaft 8, a commutator 10, an armature core 12, and windings 13a to 13e. The commutator 10 includes commutator segments 9 fixed to the rotation shaft 8 and arranged next to one another in a circumferential direction. The armature core 12 includes teeth 11 fixed to and extending radially from the rotation shaft 8. The windings 13a to 13e are wound around the teeth 11.

Ten commutator segments 9 and ten teeth 11 are arranged in the circumferential direction. In other words, the DC motor of the first embodiment is a 4-pole 10-slot motor. Each of the windings 13a to 13e has two ends connected to adjacent ones of the commutator segments 9 in the circumferential direction. Further, the windings 13a to 13e are each wound around two teeth 11 in a distributed winding. Further, commutator segments 9 that are separated by 180 degrees are connected by a short-circuiting line (not shown). The windings 13a to 13e are schematically shown in FIG. 1.

The two power feeding brushes 6 and 7 are separated from each other by 90 degrees. Each of the power feeding brushes 6 and 7 is held on the stator 4 by a brush holder (not shown). Further, each of the power feeding brushes 6 and 7 includes a distal end located at a radially inner side and pressed to contact the commutator 10 by a biasing means such as a spring (not shown). The two power feeding brushes 6 and 7 are set so that when one of the two power feeding brushes 6 and 7 is in contact with two commutator segments 9, the other one of the two power feeding brushes 6 and 7 is in contact with only one commutator segment 9. In other words, the two power feeding brushes 6 and 7 are set so that the two power feeding brushes 6 and 7 will not each be in contact with two commutator segments 9 at the same time.

The windings 13a to 13e of the present embodiment are set so that the number of turns of the predetermined windings 13a differs from the number of turns of the other windings 13b to 13e. More specifically, the windings 13a to 13e are each in pairs so that the two windings in each pair of the first windings 13a to the fifth windings 13e are in the same conductive state and separated by 180 degrees. Further, in the present embodiment, the number of turns of the first windings 13a are set to differ from that of the second to fifth windings 13b to 13e. In the present embodiment, the number of turns of the first windings 13a is set to thirty, and the number of turns of the second to fifth windings 13b to 13e is set to forty.

Figure 2:
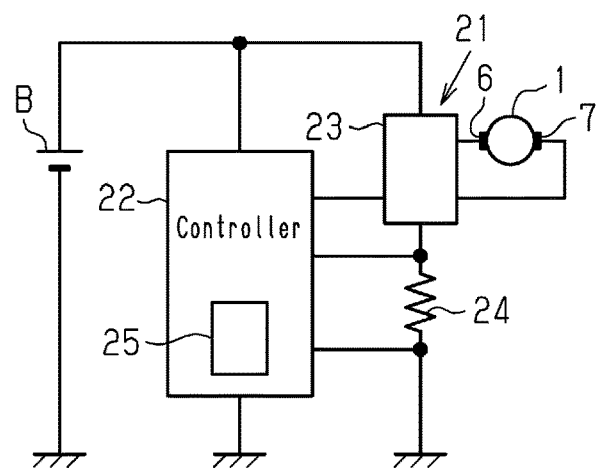
FIG. 2 is an electric circuit diagram of the DC motor in accordance with the first embodiment.

Further, as shown in FIG. 2, the DC motor includes a control circuit 21 that is connected to a battery B. The control circuit 21 includes a controller 22, a drive circuit 23, and a shunt resistor 24. The controller 22 performs various calculations and controls. The drive circuit 23 controls the current supplied to the power feeding brushes 6 and 7 with the controller 22. The shunt resistor 24 enables current detection by the controller 22.

The control circuit 21 can be circuitry including: 1) one or more processors that run a computer program (software) to execute various types of processes; 2) one or more exclusive hardware circuits such as an application specific integrated circuit (ASIC) that execute at least part of a process, or 3) a combination thereof. The processor includes a computer processing unit (CPU) and a memory, such as a random-access memory (RAM) or a read-only memory (ROM). The memory stores program codes or commands that are configured to have the CPU execute a process. A memory, which is a computer readable medium, includes any available medium that is accessible by a versatile or dedicated computer.

The controller 22 further includes a detector 25 that detects the rotation speed from the current waveform generated by the difference in the number of turns.

Figure 3:
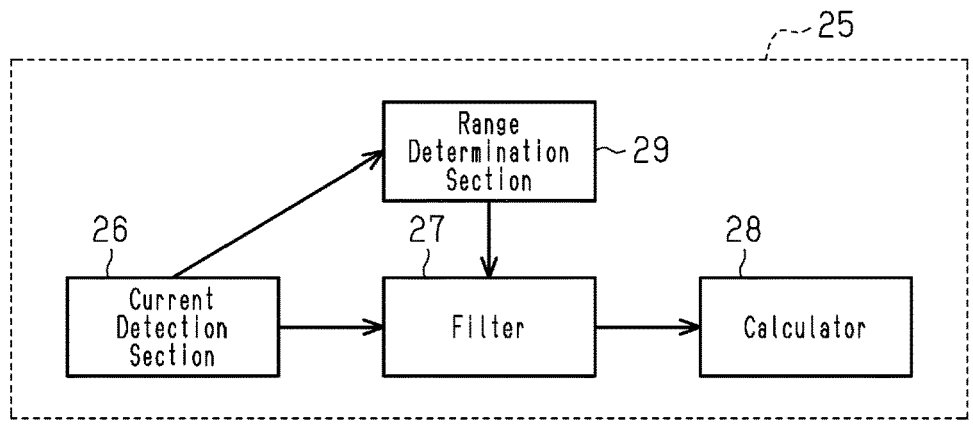
FIG. 3 is a block diagram showing a detector of the first embodiment.

More specifically, as shown in FIG. 3, the detector 25 includes a current detection section 26, a filter 27, and a calculator 28. The current detection section 26 detects current. The filter 27 passes the current waveform that is generated by the difference in the number of turns and blocks the current waveform generated when the contact state of the power feeding brushes 6 and 7 with the commutator segments 9 is switched. The calculator 28 calculates the rotation speed from the current waveform passed through the filter 27. Further, the detector 25 includes a range determination section 29 that determines a frequency range of the current waveform that is to be passed through the filter 27 from the rotation speed corresponding to a detected current value.

The operation of the motor body 1 and the detector 25 of the above-described DC motor will now be described in detail.

First, when the power feeding brushes 6 and 7 are supplied with current by the drive circuit 23, the current is sequentially supplied to the windings 13*a* to 13*e* via the commutator segments 9 and the rotor 5 is rotated.

Figure 4:
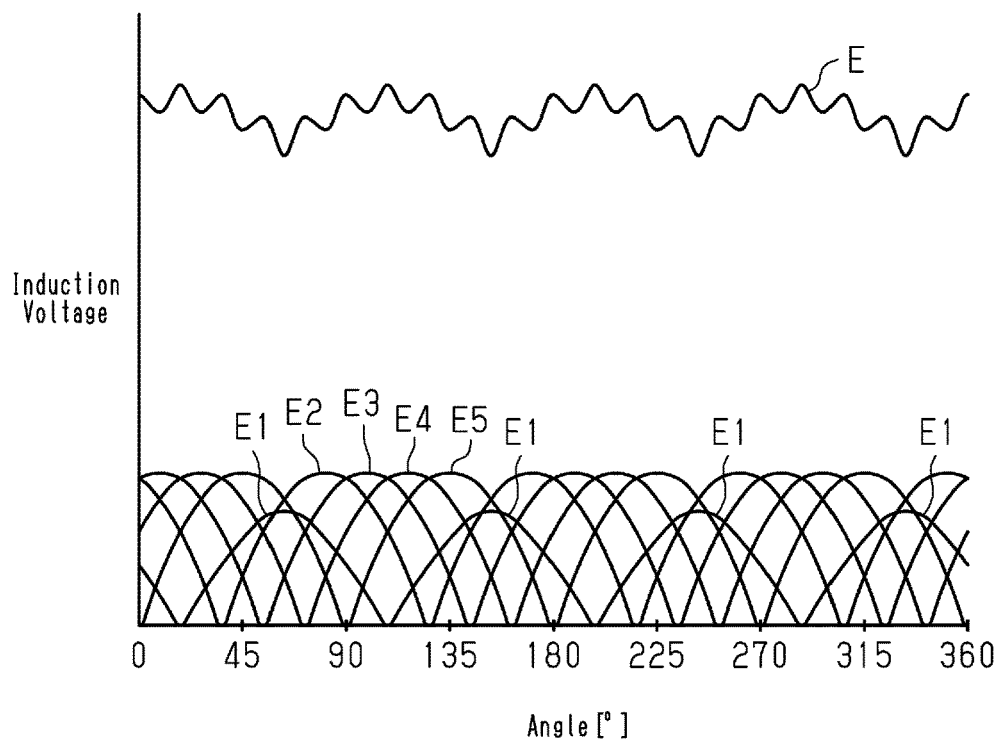
FIG. 4 is an induction voltage-angle characteristic chart of the DC motor in accordance with the first embodiment.

In this case, as shown in FIG. 4, the windings 13*a* to 13*e* that transverse the permanent magnets 3 generate induced voltage E. The generated induced voltage E is the total of induced voltages E1 to E5 generated by the first to fifth windings 13*a* to 13*e* and includes twenty short-peak cycles in each rotation (360°) and four long-peak cycles in each rotation (360°). The long-peak cycles are based on the small induced voltage E1 generated at the first windings 13*a*, each having a small number of turns. In other words, the waveform of the induced voltage E includes a twentieth-order component based on every one of the windings 13*a* to 13*e* and a fourth-order component based on the first windings 13*a* each having a small number of turns.

Figure 5:
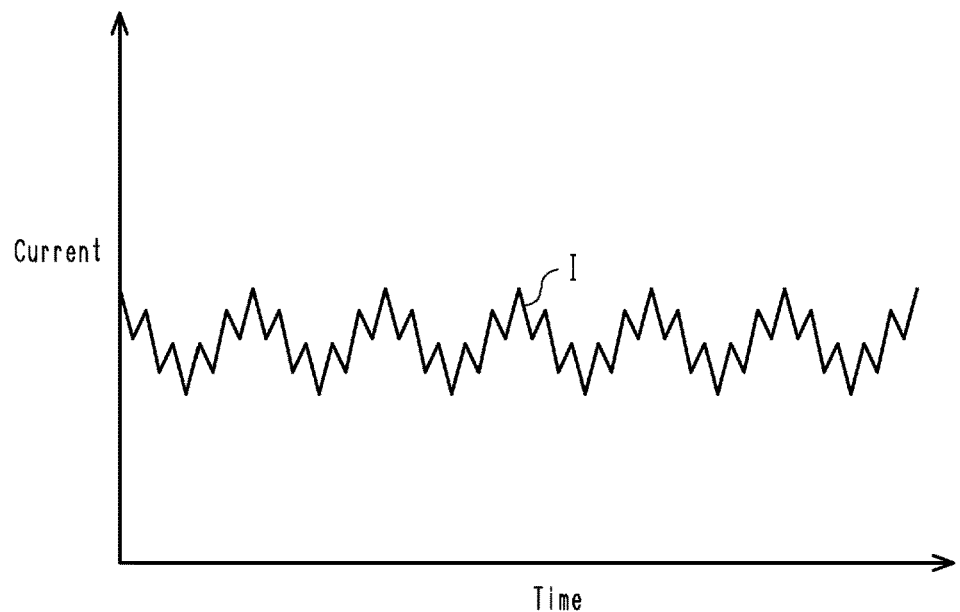
FIG. 5 is a current-time characteristic chart of the DC motor in accordance with the first embodiment.

Then, as shown in FIG. 5, the current detection section 26 of the detector 25 detects current I that includes the twentieth-order component and the fourth-order component based on the waveform of the induced voltage E.

Further, the range determination section 29 of the detector 25 reads the rotation speed that corresponds to the detected current value (for example, average value of detected current I) from prestored information. Then, the range determination section 29 determines a frequency range of the current waveform that is to be passed through the filter 27 from the read rotation speed. Specifically, the range determination section 29 determines the frequency range of current waveform generated by the difference in the number of turns. More specifically, the range determination section 29 determines an approximate rotation speed from the detected current value to determine an approximate frequency of the current waveform generated by the difference in the number of turns. Then, the range determination section 29 determines a frequency range of which the limits are separated by a preset amount from the frequency.

Then, the filter 27 of the detector 25 passes the waveform in the frequency range determined by the range determination section 29 (i.e., fourth-order component) to pass the current waveform generated by the difference in the number of turns. Further, the filter 27 blocks the current waveform at frequencies outside the frequency range determined by the range determination section 29 (i.e., mainly twentieth-order component) to block the current waveform generated when the contact state of the power feeding brushes 6 and 7 with the commutator segments 9 is switched.

Figure 6:
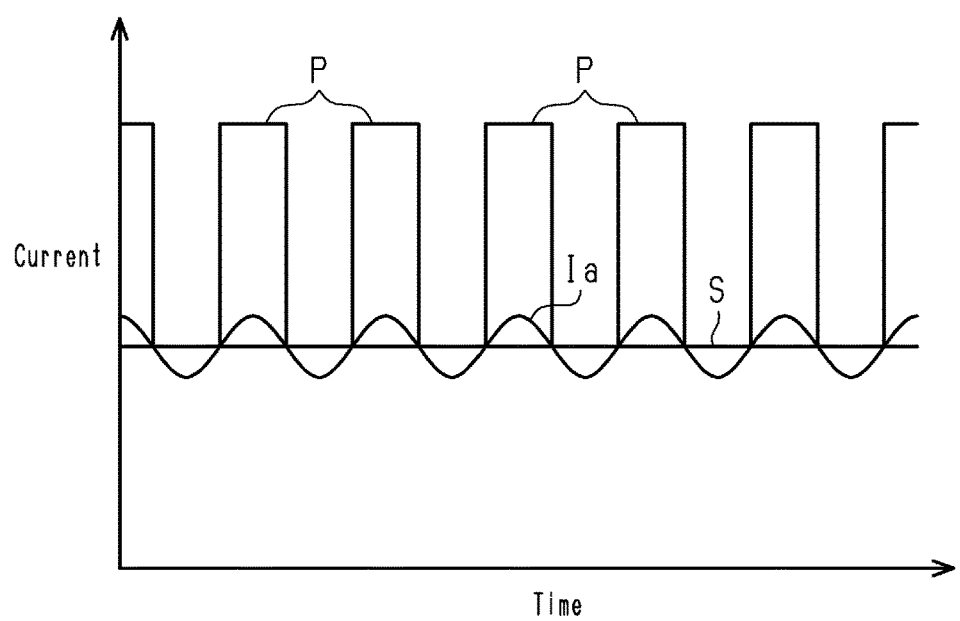
FIG. 6 is a current-time characteristic chart of the DC motor in accordance with the first embodiment.

Then, as shown in FIG. 6, the calculator 28 of the detector 25 calculates the rotation speed based on a waveform Ia passed through the filter 27. Specifically, the calculator 28 of the present embodiment generates pulses P that rise when the waveform Ia, which passes through the filter 27, rises and exceeds a threshold value S and fall when the waveform Ia falls below the threshold value. The calculator 28 counts the pulses P to calculate the rotation speed.

The first embodiment has the following advantages.

(1) The DC motor is configured so that when one of the two power feeding brushes 6 and 7 is in contact with two commutator segments 9, the other one of the two power feeding brushes 6 and 7 is in contact with only one commutator segment 9. This decreases the waveform amplitude of the current I compared to a DC motor including two power feeding brushes that are in contact with two commutator segments at the same time. Thus, vibration and noise are reduced. Further, the windings 13*a* to 13*e* wound around the teeth 11 of the armature core 12 are set so that the number of turns of the predetermined windings 13*a* differs from that of the other windings 13*b* to 13*e*. The difference in the number of turns forms a current waveform having a specific frequency (that is, fourth-order component). Furthermore, the DC motor includes the filter 27 and the calculator 28. The filter 27 passes the current waveform generated by the difference in the number of turns and blocks the current waveform generated by the switching of the contact state of the power feeding brushes 6 and 7 with the commutator segments 9. The calculator 28 calculates the rotation speed from the current waveform passed through the filter 27. This reduces the effect of waveform disturbance caused by vibration or the like of the power feeding brushes 6 and 7 and allows for highly accurate detection of the rotation speed.

(2) The DC motor includes the range determination section 29 that determines the frequency range of current waveform that is to be passed through the filter 27 from the rotation speed corresponding to the detected current value. Thus, the current waveform generated by the difference in the number of turns in accordance with the present rotation speed passes the filter 27 in a satisfactory manner. In this manner, the range determination section 29 sets the frequency range of the current waveform that is to be passed through the filter 27 to a preferred range that corresponds to the rotation speed of the rotor 5.

A second embodiment of a DC motor will now be described with reference to FIGS. 1 and 8 to 14.

The DC motor of the second embodiment has the same structure as the DC motor of the first embodiment shown in FIG. 1.

Figure 8:
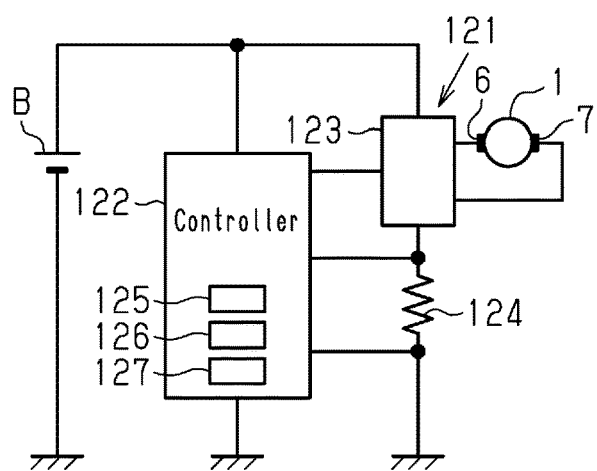
FIG. 8 is an electric circuit diagram of the DC motor in accordance with a second embodiment.

As shown in FIG. 8, the DC motor of the second embodiment includes a control circuit 121 that is connected to the battery B. The control circuit 121 of the second embodiment will now be described focusing on differences from the control circuit 21 of the first embodiment. The control circuit 121 includes a controller 122, a drive circuit 123, and a shunt resistor 124. The controller 122 performs various calculations and controls. The drive circuit 123 controls the current supplied to the power feeding brushes 6 and 7 with the controller 122. The shunt resistor 124 enables current detection by the controller 122.

The controller 122 includes a first filter 125 and a second filter 126. The first filter 125 passes the current waveform generated by the difference in the number of turns. The second filter 126 passes the current waveform formed generated by the switching of the contact state of the power feeding brushes 6 and 7 with the commutator segments 9.

More specifically, the first filter 125 passes the current waveform generated by the difference in the number of turns and blocks other current waveforms generated by, for example, the switching of the contact state of the power feeding brushes 6 and 7 with the commutator segments 9. Further, the second filter 126 passes the current waveform generated by the switching of the contact state of the power feeding brushes 6 and 7 with the commutator segments 9 and blocks other current waveforms that are generated by, for example, the difference in the number of turns.

Further, the controller 122 includes a detector 127 that detects a waveform anomaly using the current waveform passed through the first filter 125 and the current waveform passed through the second filter 126.

More specifically, the detector 127 calculates a theoretical cycle of the current waveform generated by the difference in the number of turns from the cycle of the current waveform passed through the second filter 126. Then, the detector 127 detects a waveform anomaly in the current with the theoretical cycle and the cycle of the current waveform passed through the first filter 125. Specifically, the detector 127 determines that the current waveform includes a missing peak when the theoretical cycle is greater than a value obtained by multiplying the cycle of the current waveform passed through the first filter 125 by a preset value that is greater than one (for example, 1.1 in the present embodiment). Further, the detector 127 determines that the current waveform is split when the theoretical cycle is less than a value obtained by multiplying the cycle of the current waveform passed through the first filter 125 by a preset value that is less than one (for example, 0.9 in the present embodiment).

The operation of the motor body 1, the first filter 125, the second filter 126, and the detector 127 of the above-described DC motor will now be described in detail.

First, when the power feeding brushes 6 and 7 are supplied with current by the drive circuit 123, the current is sequentially supplied via the commutator segments 9 to the windings 13a to 13e and the rotor 5 is rotated.

Figure 9:
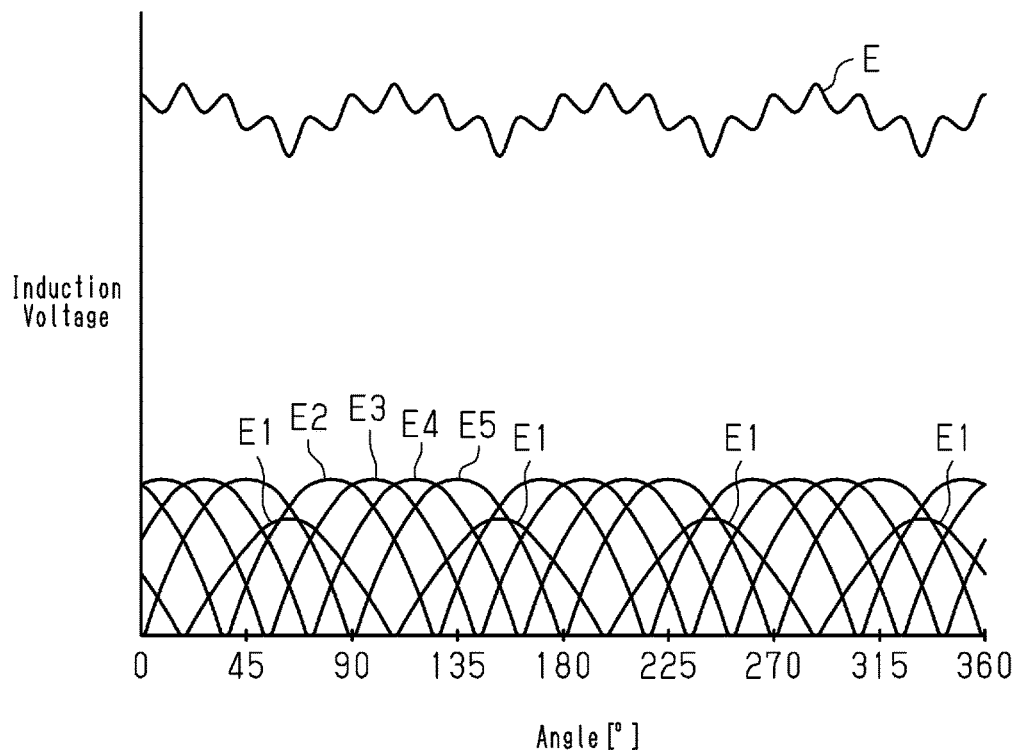
FIG. 9 is an induction voltage-angle characteristic chart of the DC motor in accordance with the second embodiment.

In this case, as shown in FIG. 9, the windings 13a to 13e that transverse the permanent magnets 3 generate induced voltage E. The generated induced voltage E is the total of induced voltages E1 to E5 generated by the first to fifth windings 13a to 13e and includes twenty short-peak cycles in each rotation (360°) and four long-peak cycles in each rotation (360°). The long-peak cycles are based on the small induced voltage E1 generated at the first windings 13a, each having a small number of turns. In other words, the waveform of the induced voltage E includes a twentieth-order component based on every one of the windings 13a to 13e and a fourth-order component based on the first windings 13a each having a small number of turns.

Figure 10:
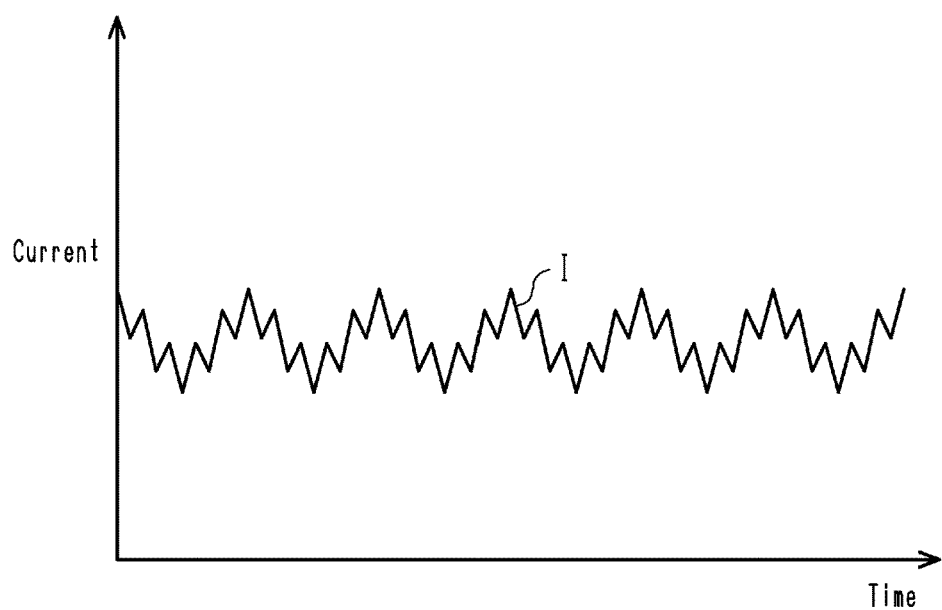
FIG. 10 is a current-time characteristic chart of the DC motor in accordance with the second embodiment.

Then, as shown in FIG. 10, the controller 122 detects current I that includes the twentieth-order component and the fourth-order component from the waveform of the induced voltage E and the switching of the contact state of the power feeding brushes 6 and 7 with the commutator segments 9.

Figure 11:
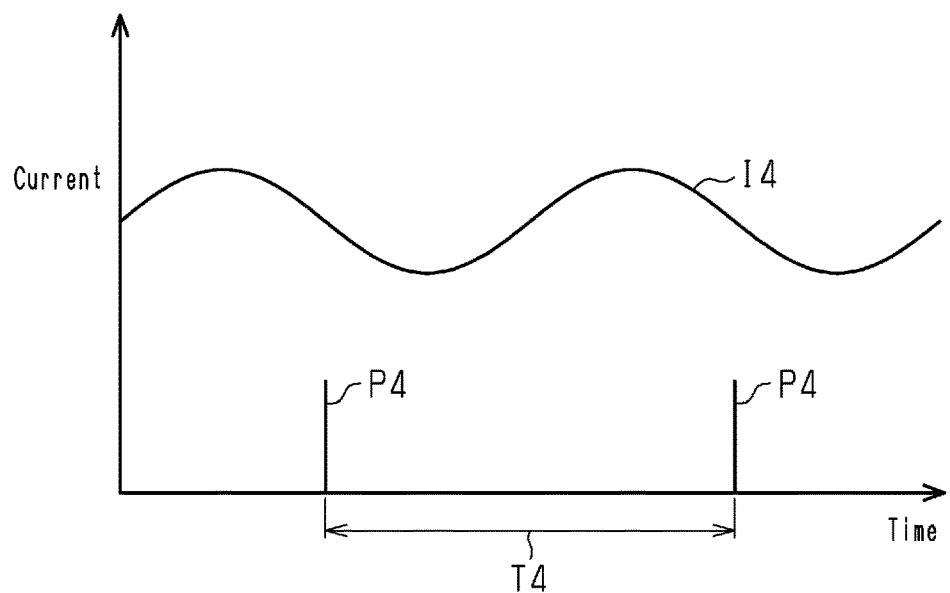
FIG. 11 is a current-time characteristic chart of the DC motor in accordance with the second embodiment.

Then, as shown in FIG. 11, the first filter 125 passes a waveform 14 generated by the difference in the number of turns (fourth-order component) and blocks other current waveforms.

Figure 12:
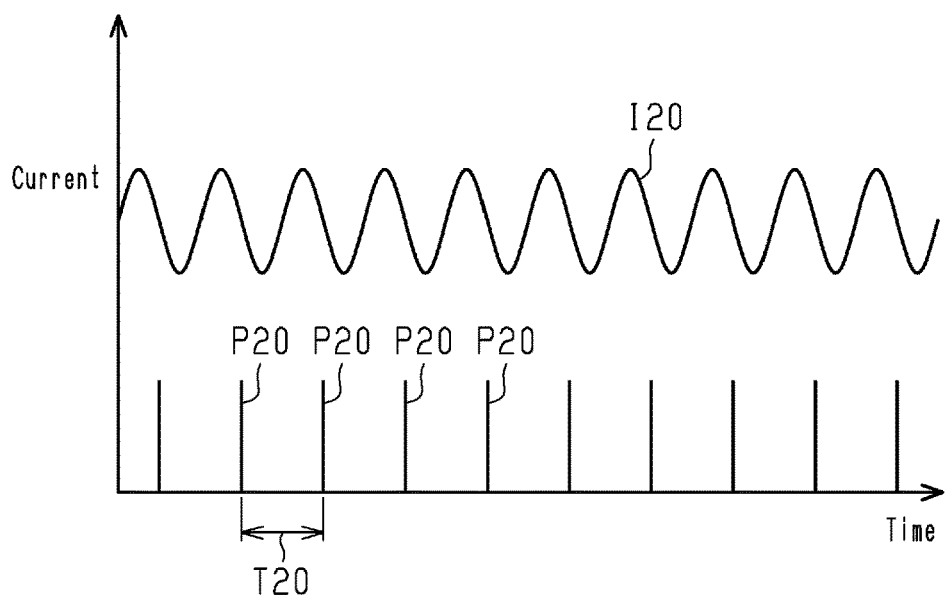
FIG. 12 is a current-time characteristic chart of the DC motor in accordance with the second embodiment.

Also, as shown in FIG. 12, the second filter 126 passes a waveform 120 generated when the contact state of the power feeding brushes 6 and 7 with the commutator segments 9 is switched (twentieth-order component) and blocks other current waveforms. The frequency ranges of the current waveforms to be passed through the first filter 125 and the second filter 126 are determined from the rotation speed corresponding to, for example, the detected current value (i.e., average value of detected current I). Theoretically, cycle T4 of a waveform 14 that passes the first filter 125 is five times greater than cycle T20 of a waveform 120 that passes the second filter 126. Further, the controller 122 generates pulses P4 and P20 when the waveform 14 passed through the first filter 125 and the waveform 120 passed through the second filter 126 become less than a threshold value. Then, the controller 122 determines that the interval of the pulses P4 is the cycle T4 of the waveform 14 and that the interval of the pulses P20 is the cycle T20 of the waveform 120.

Then, the detector 127 detects a waveform anomaly using the waveform 14 passed through the first filter 125 and the waveform 120 passed through the second filter 126.

More specifically, the detector 127 first calculates the theoretical cycle (i.e., 5×T20) of the current waveform generated by the difference in the number of turns from the cycle T20 of the waveform 120 passed through the second filter 126. Then, the detector 127 detects a waveform anomaly using the theoretical cycle and the cycle T4 of the waveform 14 passed through the first filter 125.

Specifically, the detector 127 determines whether the theoretical cycle (T20×5) is greater than a value obtained by multiplying the cycle T4 of the waveform 14 that passed through the first filter 125 by a preset value k1 that is greater than one. When an affirmative determination is given (that is, T20×5>k1×T4 is satisfied), the detector 127 determines that the waveform 120 includes a missing peak (specifically, peaks decreased in waveform 120). In the present embodiment, the value k1 is set to 1.1.

Figure 13:
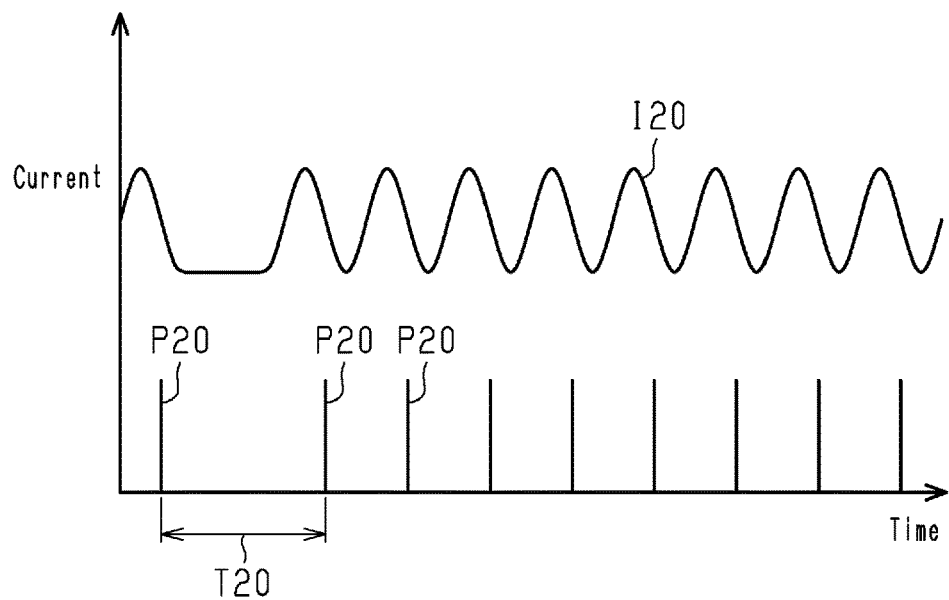
FIG. 13 is a current-time characteristic chart of the DC motor in accordance with the second embodiment.

FIG. 13 shows a case where T20×5>k1×T4 is satisfied. As shown in FIG. 13, when the waveform 120 has a missing peak (specifically, peaks decreased in waveform 120) due to vibration or the like of the power feeding brushes 6 and 7, the cycle T20 is lengthened thereby satisfying T20×5>k1×T4. Thus, a missing peak in the waveform 120 is detected.

Further, the detector 127 determines whether the theoretical cycle (T20×5) is less than a value obtained by multiplying the cycle T4 of the waveform 14 that passed through the first filter 125 by a preset value k2 that is less than one. When an affirmative determination is given (that is, T20×5<k2×T4 is satisfied), the detector 127 determines that the waveform 120 is split (specifically, peaks increased in waveform 120). In the present embodiment, the value k2 is set to 0.9.

Figure 14:
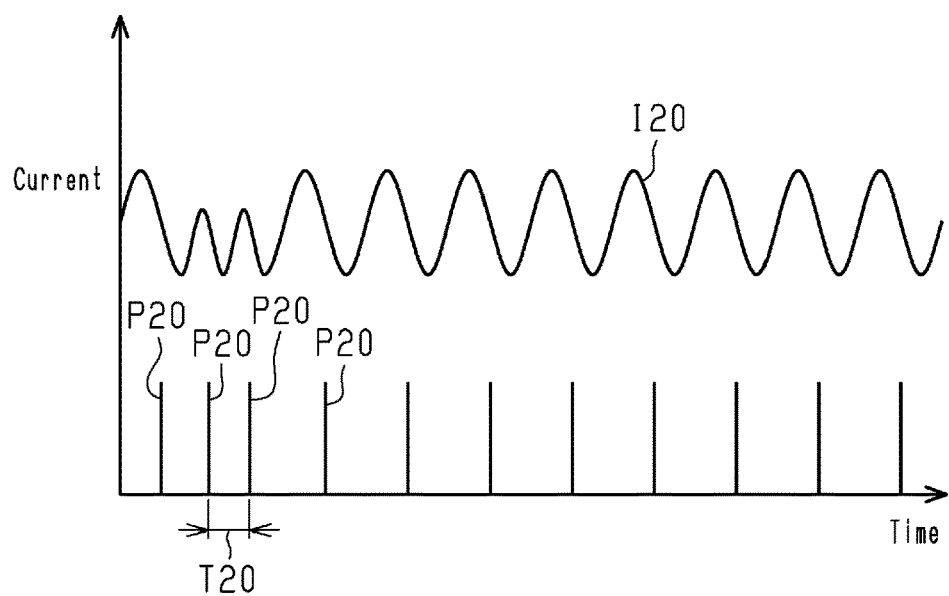
FIG. 14 is a current-time characteristic chart of the DC motor in accordance with the second embodiment.

FIG. 14 shows a case where T20×5<k2×T4 is satisfied. As shown in FIG. 14, when the waveform 120 is split (specifically, peaks increased in waveform 120) due to vibration or the like of the power feeding brushes 6 and 7, the cycle T20 is shortened thereby satisfying T20×5<k2×T4. Thus, a split peak in the waveform 120 is detected.

The second embodiment has the following advantages.

(3) The windings 13a to 13e wound around the teeth 11 of the armature core 12 are set so that the number of turns of the predetermined windings 13a differs from that of the other windings 13b to 13e. The difference in the number of turns forms a current waveform having a specific frequency (i.e., fourth-order component). The DC motor includes the first filter 125 that passes the waveform 14 generated by the difference in the number of turns and the second filter 126 that passes the waveform 120 generated by the switching of the contact state of the power feeding brushes 6 and 7 with the commutator segments 9. Thus, two related waveforms 14 and 120 that differ from each other are obtained simultaneously. The DC motor includes the detector 127 that detects a waveform anomaly in the current using the waveform 14 passed through the first filter 125 and the waveform 120 passed through the second filter 126. Thus, a waveform anomaly in the current can be detected at any time. That is, a waveform anomaly in the current can always be detected regardless of the previous current waveform. For example, even when the current waveform successively includes a missing peak or a split peak, an anomaly can be detected with high accuracy.

(4) The detector 127 calculates the theoretical cycle of the current waveform generated by the difference in the number of turns from the cycle T20 of the waveform 120 passed through the second filter 126 to detect a waveform anomaly in current using the theoretical cycle and the cycle T4 of the waveform 14 passed through the first filter 125. Thus, an anomaly is specifically detected with a high degree of accuracy.

(5) The detector 127 determines that the waveform 120 includes a missing peak when the theoretical cycle (that is, T20×5) is greater than a value obtained by multiplying the cycle T4 of the waveform 14 that passed through the first filter 125 by the preset value k1 that is greater than one (1.1 in the present embodiment) (that is, T20×5>k1×T4 is satisfied). In this manner, a missing peak in the waveform 120, or a decrease in the peaks of the waveform 120, is detected.

(6) The detector 127 determines that the waveform 120 includes a split peak when the theoretical cycle (that is, T20×5) is less than a value obtained by multiplying the cycle T4 of the waveform 14 that passed through the first filter 125 by the preset value k2 that is less than one (0.9 in the present embodiment) (that is, T20×5<k2×T4 is satisfied). In this manner, a split peak in the waveform 120 of the current is split, or an increase in the peaks of the waveform 120, is detected.

(7) When one of the two power feeding brushes 6 and 7 is in contact with two commutator segments 9, the other one of the two power feeding brushes 6 and 7 is in contact with only one commutator segment 9. This decreases the waveform amplitude of current I compared to a DC motor including two power feeding brushes that are both in contact with two commutator segments at the same time. Thus, vibration and noise are reduced. Even though the decreased waveform amplitude of the current I may hinder detection of a waveform anomaly in the current, an anomaly can be detected with high accuracy for the reasons described above.

A third embodiment of a DC motor will now be described with reference to FIGS. 1 and 15 to 18.

The DC motor of the third embodiment has the same structure as the DC motor of the first embodiment shown in FIG. 1.

Figure 15:
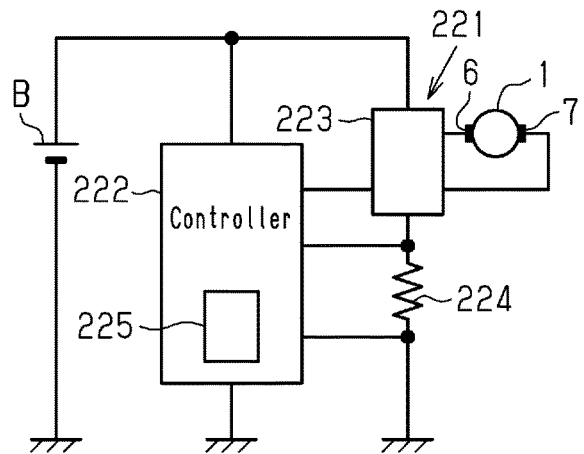
FIG. 15 is an electric circuit diagram of the DC motor in accordance with a third embodiment.

As shown in FIG. 15, the DC motor of the third embodiment includes a control circuit 221 that is connected to the battery B. The control circuit 221 of the third embodiment will now be described focusing on differences from the control circuit 21 of the first embodiment. The control circuit 221 includes a controller 222, a drive circuit 223, and a shunt resistor 224. The controller 222 performs various calculations and controls. The drive circuit 223 controls the current supplied to the power feeding brushes 6 and 7 with the controller 222. The shunt resistor 224 enables current detection by the controller 222.

The controller 222 further includes a detector 225 that detects the rotation speed from a current waveform generated by the difference in the number of turns. More specifically, the detector 225 of the present embodiment determines a frequency of the current waveform generated by the difference in the number of turns using a fast Fourier transform and calculates the rotation speed from the frequency. Further, the detector 225 determines a frequency range of the current waveform generated by the difference in the number of turns from the rotation speed corresponding to a detected current value. Then, the detector 225 sets the frequency having the largest amplitude in the frequency range, which is obtained as a result of the fast Fourier transform performed on the current waveform, as the frequency of the current waveform generated by the difference in the number of turns.

The operation of the motor body 1 and the detector 225 of the above-described DC motor will now be described in detail.

First, when the power feeding brushes 6 and 7 are supplied with current by the drive circuit 223, the current is sequentially supplied via the commutator segments 9 to the windings 13a to 13e and the rotor 5 is rotated.

Figure 16:
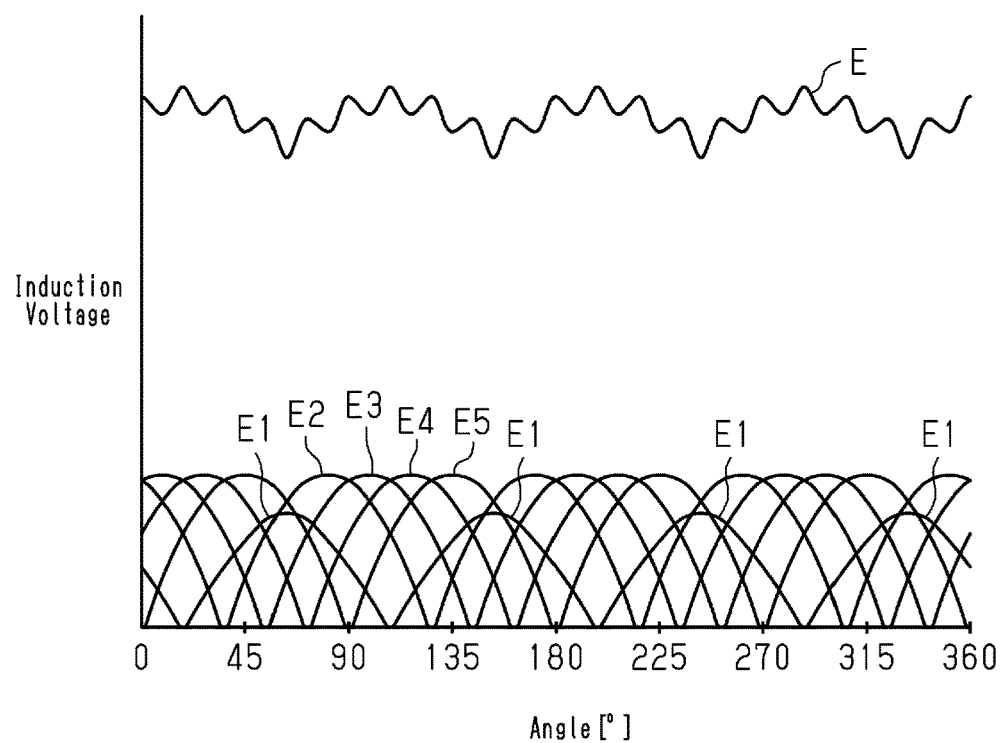
FIG. 16 is an induction voltage-angle characteristic chart of the DC motor in accordance with the third embodiment.

In this case, as shown in FIG. 16, the windings 13a to 13e that transverse the permanent magnets 3 generate induced voltage E. The generated induced voltage E is the total of induced voltages E1 to E5 generated by the first to fifth windings 13a to 13e and includes twenty short-peak cycles in each rotation (360°) and four long-peak cycles in each rotation (360). The long-peak cycles are based on the small induced voltage E1 generated at the first windings 13a, each having a small number of turns. In other words, the waveform of the induced voltage E includes a twentieth-order component based on every one of the windings 13a to 13e and a fourth-order component based on the first windings 13a each having a small number of turns.

Figure 17:
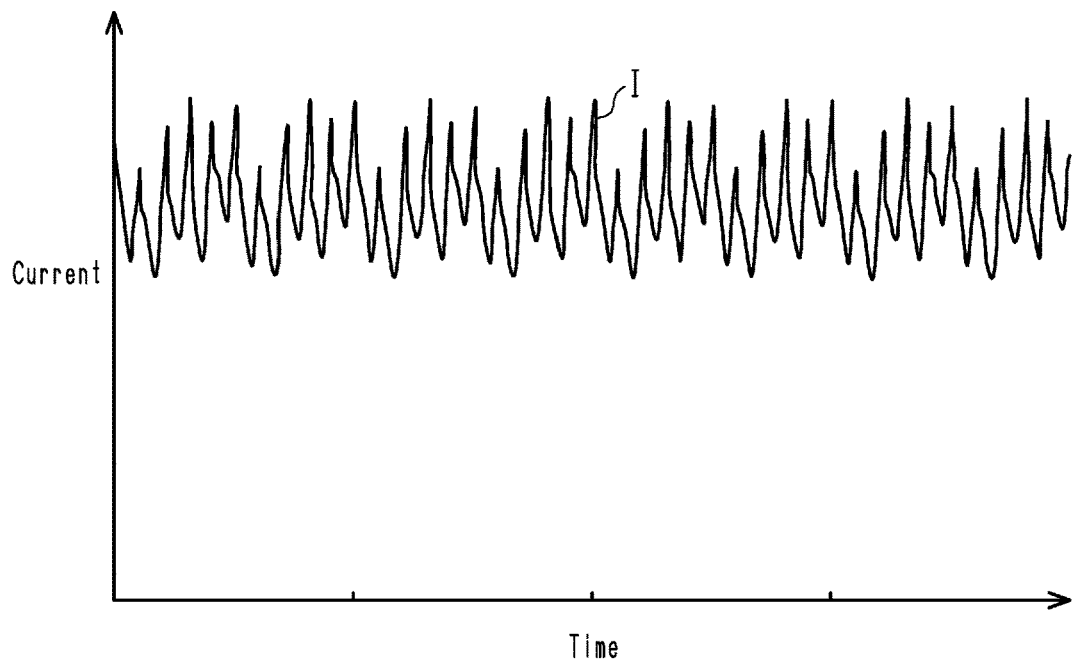
FIG. 17 is a current-time characteristic chart of the DC motor in accordance with the third embodiment.

As shown in FIG. 17, the current detection section 26 of the detector 225 detects current I that includes the twentieth-order component and the fourth-order component from the waveform of the induced voltage E.

Further, the detector 225 reads the rotation speed that corresponds to the detected current value (for example, average value of detected current I) from prestored information. Then, the detector 225 determines a frequency range X (refer to FIG. 18) of the current waveform generated by the difference in the number of turns from the read rotation speed. In other words, the detector 225 determines an approximate rotation speed from the detected current value to determine an approximate frequency of the current waveform generated by the difference in the number of turns. Then, the detector 225 determines the frequency range X of which the limits are separated by a preset amount from the frequency.

Figure 18:
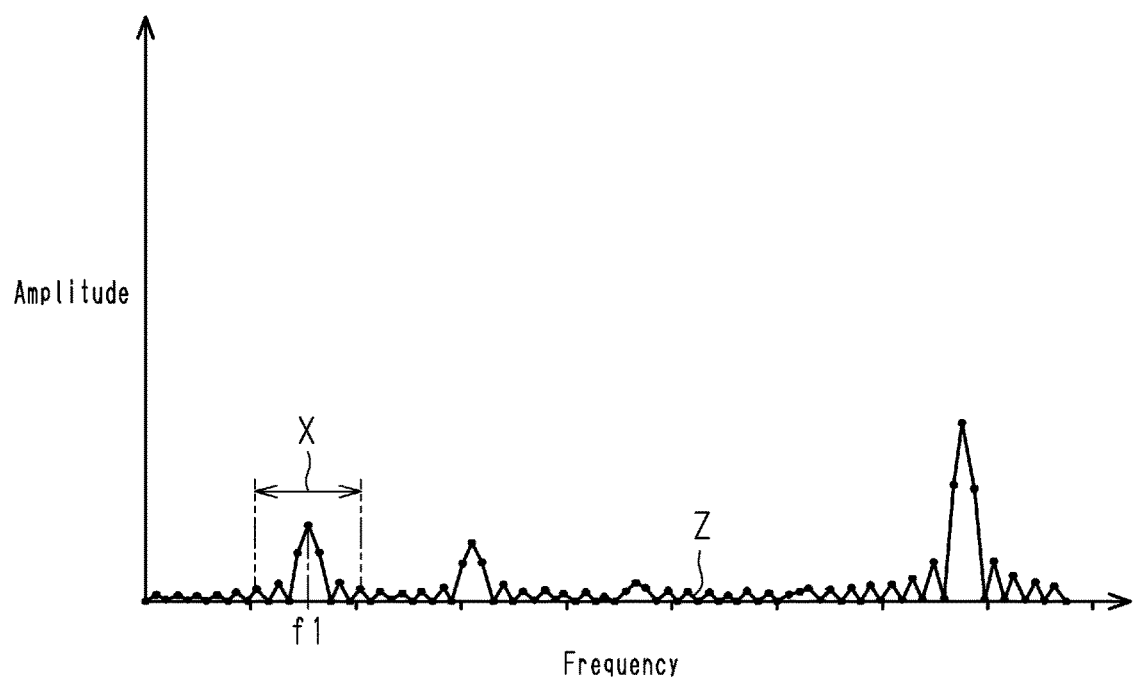
FIG. 18 is an amplitude-frequency characteristic chart of the DC motor in accordance with the third embodiment.

Then, as shown in FIG. 18, the detector 225 performs a fast Fourier transform on the current I and determines that frequency f1 having the largest amplitude in the frequency range X of result Z of the fast Fourier transform is the frequency of the current waveform generated by the difference in the number of turns. The detector 225 calculates the rotation speed from the frequency f1 (rotation speed K [rpm]=f1/4×60).

The third embodiment has the following advantages.

(8) The DC motor is configured so that when one of the two power feeding brushes 6 and 7 is in contact with two commutator segments 9, the other one of the two power feeding brushes 6 and 7 is in contact with only one commutator segment 9. This decreases the waveform amplitude of the current I as compared to a DC motor including two power feeding brushes that are both in contact with two commutator segments at the same time. Thus, vibration and noise are reduced. Further, the windings 13a to 13e wound around the teeth 11 of the armature core 12 are set so that the number of turns of the predetermined windings 13a differs from that of the other windings 13b to 13e. The difference in the number of turns generates a current waveform having a specific frequency (that is, fourth-order component). The DC motor includes the detector 225 that detects the rotation speed from the current waveform generated by the difference in the number of turns (that is, fourth-order component). This reduces the effect of waveform disturbance caused by vibration or the like of the power feeding brushes 6 and 7 and allows the rotation speed to be detected with high accuracy.

(9) The detector 225 of the present embodiment determines the frequency of the current waveform generated by the difference in the number of turns using a fast Fourier transform and calculates the rotation speed from the frequency. Thus, the rotation speed is obtained easily and promptly.

(10) The detector 225 determines the frequency range X of the current waveform generated by the difference in the number of turns from the rotation speed that corresponds to the detected current value. Then, the detector 225 determines the frequency f1 having the largest amplitude in the frequency range X of the result Z of the fast Fourier transform performed on the current waveform as the frequency of the current waveform generated by the difference in the number of turns. Thus, the rotation speed is obtained easily and promptly.

The first to third embodiments may be modified as follows. The first to third embodiments and the following modifications can be combined as long as the combined modifications remain technically consistent with each other.

In the first embodiment, the range determination section 29 is included to determine the frequency range of the current waveform that is to be passed through the filter 27 from the rotation speed corresponding to the detected current value. Alternatively, the frequency range of the current waveform that is to be passed through the filter 27 may be determined by a different process.

In the first embodiment, the calculator 28 of the detector 25 generates the pulses P that rise when the waveform Ia passed through the filter 27 rises and exceeds the threshold value S and fall when the waveform Ia falls below the threshold value. Then, the calculator 28 counts the pulses P to calculate the rotation speed. Alternatively, the rotation speed may be calculated by a different process such as counting extremal values of the waveform Ia passed through the filter 27.

The detector 127 of the second embodiment may detect a waveform anomaly through a process differing from that of the second embodiment as long as a waveform anomaly is detected from the waveform 14 passed through the first filter 125 and the waveform 120 passed through the second filter 126. For example, in the second embodiment, the detector 127 calculates the theoretical cycle (that is, T20×5) of the current waveform generated by the difference in the number of turns from the cycle T20 of the waveform 120 passed through the second filter 126, and detects a waveform anomaly using the theoretical cycle and the cycle T4 of the waveform 14 passed through the first filter 125. However, this process may be reversed. That is, the theoretical cycle (i.e., T4/5) of the current waveform generated by the switching of the contact state of the power feeding brushes 6 and 7 with the commutator segments 9 may be calculated from the cycle T4 of the waveform 14 passed through the first filter 125, and a waveform anomaly may be detected using the theoretical cycle and the cycle T20 of the waveform 120 passed through the second filter 126.

In the second embodiment, the detector 127 determines whether the theoretical cycle is greater than a value obtained by multiplying the cycle T4 of the waveform 14 that passed through the first filter 125 by the preset value k2 that is greater than one. Alternatively, the detector 127 may determine whether the theoretical cycle is greater than a value obtained by adding a preset positive number to the cycle T4 of the waveform 14 passed through the first filter 125.

In the second embodiment, the detector 127 determines whether the theoretical cycle is less than a value obtained by multiplying the cycle T4 of the waveform 14 that passed through the first filter 125 by the preset value k2 that is less than one. Alternatively, the detector 127 may determine whether the theoretical cycle is less than a value obtained by subtracting a preset positive number from the cycle T4 of the waveform 14 that passed through the first filter 125.

In the second embodiment, the value k1 that is greater than one is 1.1, and the value k2 that is less than one is 0.9. These numerical values may be changed. For example, the value k1 may be 1.2, and the value k2 may be 0.8.

In the third embodiment, the detector 225 determines the frequency of the current waveform generated by the difference in the number of turns to calculate the rotation speed from the frequency. Alternatively, the rotation speed may be detected through a different process as long as the rotation speed is detected from the current waveform generated by the difference in the number of turns (that is, fourth-order component).

In the third embodiment, the frequency range X of the current waveform generated by the difference in the number of turns may be determined through any of various processes.

Specifically, the detector 225 may, for example, read a rotation speed corresponding to the detected current value from prestored information, calculate the frequency of the current waveform generated by on the difference in the number of turns from the read rotation speed, and set the limits of the frequency range X to plus/minus 10% from the calculated frequency. The rate may be changed from plus/minus 10% to other preset rates such as 20% or 30%.

Further, in the third embodiment, the detector 225 obtains the frequency f1 having the largest amplitude in the frequency range X of the result Z obtained by performing a fast Fourier transform on the current waveform as the frequency of the current waveform generated by the difference in the number of turns. Then, the detector 225 calculates the rotation speed from the frequency f1 (rotation speed K [rpm]=f1/4×60). Alternatively, the rotation speed may be calculated through a different process.

For example, the detector 225 may include a filter that passes a current waveform having frequencies in the frequency range X of the result Z, which is obtained by performing a fast Fourier transform on the current waveform. Then, an inverse fast Fourier transform may be performed on the data passed through the filter. The obtained current waveform may be, for example, converted into pulses to calculate the frequency of the current waveform generated by the difference in the number of turns and then calculate the rotation speed from the frequency.

In the first to third embodiments, the present disclosure is applied to a DC motor of 4-pole 10-slot type. However, the present disclosure may be applied to other DC motors that includes 2P poles (where P is integer greater than or equal to two) and teeth (i.e., slots) and commutator segments, the number of which cannot be divided evenly by 2P, such as 4-pole 14-slot motor.

Figure 7:
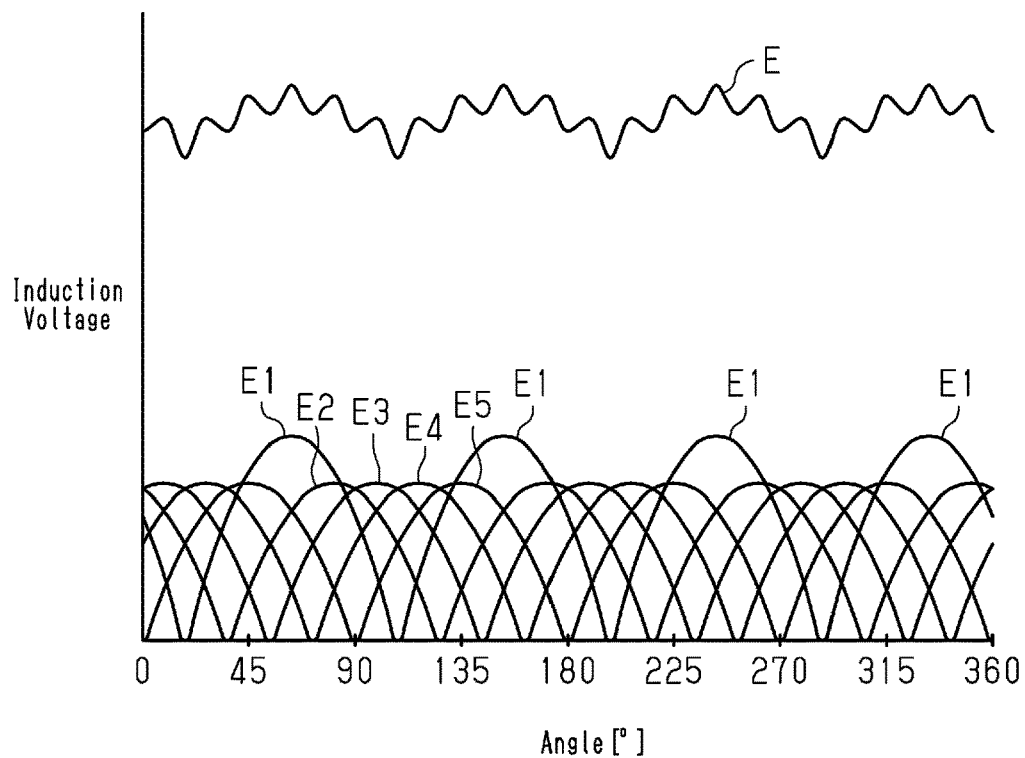
FIG. 7 is an induction voltage-angle characteristic chart of a DC motor in accordance with a modified example of the first embodiment.

In the first to third embodiments, the number of turns of the first windings 13*a* is set to differ from that of the second to fifth windings 13*b* to 13*e*. Alternatively, the number of turns of two or more sets of windings may be set to differ from that of the other windings. Also, in the first to third embodiments, the number of turns of the first windings 13*a* is set to thirty, and the number of turns of the second to fifth windings 13*b* to 13*e* is set to forty. This may be changed. For example, the number of turns of the first windings 13*a* may be set to fifty, and the number of turns of the second to fifth windings 13*b* to 13*e* may be set to sixty. Further, the number of turns of the first windings 13*a* may be greater than that of the second to fifth windings 13*b* to 13*e*. For example, the number of turns of the first windings 13*a* may be set to forty, and that of the second to fifth windings 13*b* to 13*e* may be set to thirty. In this case, as shown in FIG. 7, the windings 13a to 13e that transverse the permanent magnets 3 generate induced voltage E. The generated induced voltage E is the total of induced voltages E1 to E5 generated by the first to fifth windings 13a to 13e and includes twenty short-peak cycles in each rotation (360°) and four long-peak cycles in each rotation (360°). The long-peak cycles are based on the large induced voltage E1 generated at the first windings 13a, each having a large number of turns. In other words, the waveform of the induced voltage E includes a twentieth-order component based on every one of the windings 13a to 13e and a fourth-order component based on the first windings 13a each having a large number of turns. In such cases, the advantages in the first to third embodiments are also obtained.

In the first to third embodiments, the number of turns of the first windings 13a is set to differ from that of the second to fifth windings 13b to 13e. In other words, the number of turns of the winding that is located the most radially inward is set to differ from the other windings. Instead, the number of turns of the winding that is located the most radially outward may be set to differ from the other windings. In an example, the number of turns of the fifth windings 13e is set to differ from that of the first to fourth windings 13a to 13d. In an example of such a structure, the number of turns of the fifth windings 13e is set to forty, and the number of turns of the first to fourth windings 13a to 13d is set to thirty. In this structure, the number of turns may also be changed. For example, the number of turns of the fifth windings 13e may be set to sixty, and the number of turns of the first to fourth windings 13a to 13d may be set to fifty. Alternatively, the number of turns of the fifth windings 13e may be less than that of the first to fourth windings 13a to 13d. For example, the number of turns of the fifth windings 13e may be set to thirty, and the number of turns of the first to fourth windings 13a to 13d may be set to forty. In such cases, the advantages of the first to third embodiments are also obtained.

The present disclosure described in accordance with examples is to be considered as illustrative and not restrictive, and the present disclosure is not to be limited to the details given herein, but may be modified within the scope and equivalence of the appended claims.

The invention claimed is:

1. A direct current motor, comprising:
   an armature core including teeth;
   windings respectively wound around the teeth, wherein the windings are set so that, among the windings, a number of turns of a predetermined winding differs from a number of turns of the windings other than the predetermined winding;
   a first filter configured to pass a current waveform generated by the difference in the number of turns;
   two power feeding brushes;
   commutator segments;
   a second filter configured to pass a current waveform generated by switching of a contact state of the two power feeding brushes with the commutator segments; and
   a detector configured to detect a waveform anomaly in current by
      (i) calculating a theoretical cycle of the current waveform generated by the difference in the number of turns from a cycle of the current waveform passed through the second filter, and
      (ii) comparing the calculated theoretical cycle with a cycle of the current waveform that passed through the first filter.

2. The direct current motor according to claim 1, wherein the detector is configured to determine that the current waveform has a missing peak when the theoretical cycle is greater than a value obtained by multiplying the cycle of the current waveform that passed through the first filter by a preset value that is greater than one.

3. The direct current motor according to claim 1, wherein the detector is configured to determine that the current waveform includes a split peak when the theoretical cycle is less than a value obtained by multiplying the cycle of the current waveform that passed through the first filter by a preset value that is less than one.

4. The direct current motor according to claim 1, wherein the direct current motor is configured so that when one of the two power feeding brushes is in contact with two of the commutator segments, the other one of the two power feeding brushes is in contact with only one of the commutator segments.

5. The direct current motor according to claim 1, wherein the theoretical cycle of the current waveform is five times greater than the cycle of the current waveform that passed through the second filter.

6. The direct current motor according to claim 1, wherein the first filter is configured to pass a waveform of fourth-order component that is the current waveform generated by the difference in the number of turns.

7. The direct current motor according to claim 1, wherein the second filter is configured to pass a waveform of twentieth-order component that is the current waveform generated by switching of the contact state of the two power feeding brushes with the commutator segments.

* * * * *